United States Patent
Heinz, Jr.

[11] Patent Number: 6,033,799
[45] Date of Patent: Mar. 7, 2000

[54] MINIATURE GALVANIC CELL HAVING OPTIMUM INTERNAL VOLUME FOR THE ACTIVE COMPONENTS

[75] Inventor: Henry Heinz, Jr., Sheffield Lake, Ohio

[73] Assignee: Eveready Battery Company, Inc., St. Louis, Mo.

[21] Appl. No.: 08/970,634

[22] Filed: Nov. 14, 1997

[51] Int. Cl.[7] .................................................. H01M 2/08
[52] U.S. Cl. ........................... 429/164; 429/174; 429/185
[58] Field of Search .................................. 429/171, 172, 429/174, 185, 27, 162–164

[56] References Cited

U.S. PATENT DOCUMENTS

| | | | |
|---|---|---|---|
| 3,223,555 | 12/1965 | Solomon et al. | 429/174 X |
| 4,064,329 | 12/1977 | Naylor | 429/174 |
| 4,302,517 | 11/1981 | Dziak . | |
| 4,343,869 | 8/1982 | Oltman et al. | 429/162 X |
| 4,533,609 | 8/1985 | Dey et al. | 429/172 |
| 4,791,034 | 12/1988 | Dopp | 429/174 X |
| 5,576,117 | 11/1996 | Morita et al. | 429/162 |
| 5,582,932 | 12/1996 | Oltman et al. | 429/171 X |
| 5,629,108 | 5/1997 | Lake . | |
| 5,676,709 | 10/1997 | Tuttle . | |
| 5,712,058 | 1/1998 | Malay . | |

FOREIGN PATENT DOCUMENTS

| | | |
|---|---|---|
| 3034600 | 9/1982 | Germany . |
| 19647593 | 5/1998 | Germany . |

*Primary Examiner*—Stephen Kalafut
*Attorney, Agent, or Firm*—Russell H. Toye, Jr.; Robert W. Welsh

[57] ABSTRACT

A miniature galvanic cell tube employing a cup-tube assembly, preferably a shrunk tube, in which the tube occupies a minimum volume so that the internal volume of the cell can be maximized to contain the acting components of this cell and a process for producing the galvanic cell.

16 Claims, 2 Drawing Sheets

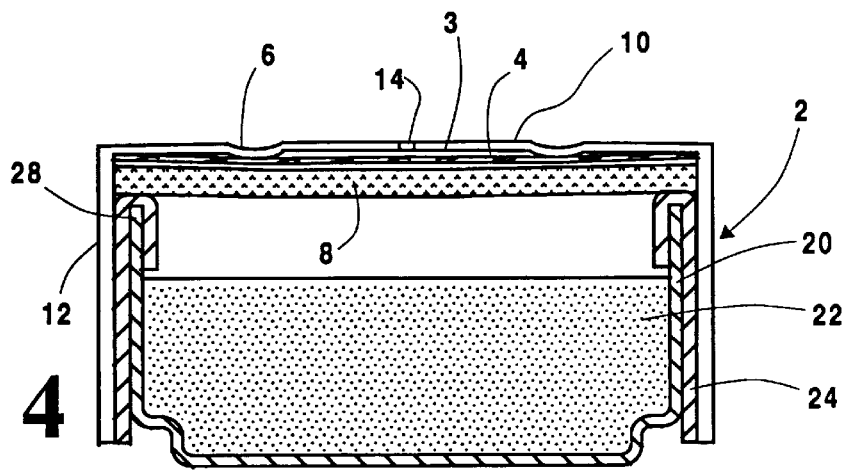
Fig. 4
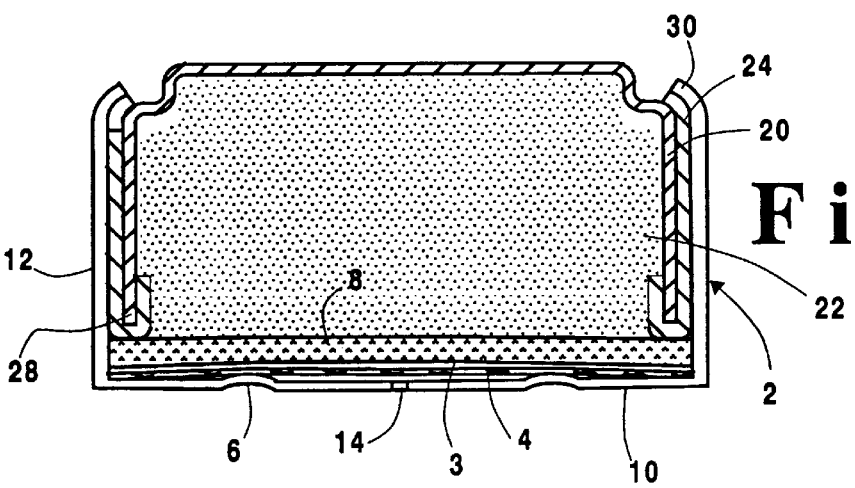
Fig. 5
Fig. 6

MINIATURE GALVANIC CELL HAVING OPTIMUM INTERNAL VOLUME FOR THE ACTIVE COMPONENTS

FIELD OF THE INVENTION

This invention relates to a miniature type of galvanic cell employing a cup-tube assembly that occupies a relatively small volume so that the internal volume of this cell is reserved primarily for the active components of the cell. This invention also relates to a process for producing a miniature galvanic cell having optimum internal volume for the active components of the cell.

BACKGROUND OF THE INVENTION

The miniaturization of electronic devices has created a demand for small but powerful electrochemical cells. Cells that utilize an alkaline electrolyte are known to provide high energy density per unit volume and are therefore well suited for applications in miniature electronic devices such as hearing aids, watches and calculators. However, alkaline electrolytes, such as aqueous potassium hydroxide and sodium hydroxide solutions, have an affinity for wetting metal surfaces and are known to creep through the sealed metal interface of an electrochemical cell. Leakage in this manner can deplete the electrolyte solution from the cell and can also cause a corrosive deposit on the surface of the cell that detracts from the cell's appearance and marketability. These corrosive salts may also damage the device in which the cell is housed. Typical cell systems where this problem is encountered include silver oxide-zinc cells, nickel-cadmium cells, air depolarized cells, and alkaline manganese dioxide cells.

In the prior art it has been a conventional practice to incorporate insulating gaskets between the cell's cup and can so as to provide a seal for the cell. Generally, the gasket must be made of a material inert to the electrolyte contained in the cell and the cell environment. In addition, it must be flexible and resistant to cold flow under pressure of the seal and maintain these characteristics so as to insure a proper seal during long periods of storage. Materials such as nylon, polypropylene, ethylene-tetrafluoroethylene copolymer and high density polyethylene have been found to be suitable as gasket materials for most applications. Typically, the insulating gasket is in the form of a "J" shaped configuration in which the extended wall of the cup is inserted so that upon being radially squeezed, the bottom portion of the gasket forms a seal with the bottom portion of the wall of the cup. The gasket generally extends the entire length of the internal wall of the cell. The volume of the gasket is generally in excess of 20% of the internal volume of the cell and therefore results in a waste of space in the cell for the active components of the cell. To better insure a good seal, a sealant is generally applied to the gasket, including its U-shaped groove, so that upon insertion of the cup into the gasket, the edge of the extended wall of the cup will seat in the sealant, and then upon the application of a compressive force the gasket will be compressed against the edge of the extended cup wall.

U.S. Pat. No. 4,302,517 discloses a sealed galvanic cell employing an insulating gasket between the can and the cup of the cell. The cell is composed of a first sealing segment disposed and compressed between the rim of the can and the edge of the cup and a second can support segment extending within the cup and substantially parallel to the wall of the cup and defining a plurality of spaced apart openings which accommodate the cell's electrolyte and/or the cell's reaction product.

It is an object of the present invention to provide a miniature cylindrical cell structure that employs a thin insulator tube that occupies a minimum of the internal volume of the cell.

It is another object of the present invention to provide a tube-insulator assembly for a miniature cylindrical cell in which the electrically insulating tube comprises a shrunk film disposed between the can and cup to provide a sealed miniature cell having a large internal volume for the active components of the cell.

It is another object of the present invention to provide a process for producing a miniature cell with a tube-insulator assembly for sealing the cell. The foregoing and additional objects of the present invention will become more fully apparent from the following description and drawings.

DESCRIPTION OF THE INVENTION

The invention relates to a galvanic cell having a conductive cup with a circular upstanding peripheral wall and with a first electrode in physical contact with the cup; a thin electrically insulating tube secured to the exterior surface of the cup's upstanding wall, the tube having a film with a cross-sectional thickness of less than about 7.5 mils; and a conductive can with an upstanding wall and a second electrode in physical contact with the can; wherein the interior surface of the can's upstanding wall contacts the exterior surface of the insulating tube, thereby defining an enclosed volume.

As used herein, the term tube shall mean a tube of a unitary solid film material or comprised of two or more layers of film made of an insulating material that is sufficient in thickness to insure that the wall of the cup will be electrically insulated from the wall of the can. Preferably the thickness of the tube should be no more than 7.5 mils so that maximum volume of the cell can be used for the active components of the cell. Preferably the thickness of the tube could be between about ½ mil and about 7 mils, more preferably between about 1 mil and about 5 mils, and most preferably about 1 mil.

In one of the preferred embodiments of this invention, the electrically insulating unitary tube would be disposed over the outer surface of the peripheral wall of the cup and preferably shrunk onto the wall. If desired, a sealant, such as a hot melt adhesive, could be disposed between the upstanding wall of the can and tube and/or between the upstanding wall of the cup and the tube. Preferably, the thickness of the film for the unitary tube should be between about ½ mil and about 7.5 mils. The material for the electrically insulating unitary tube could be made of any materials such as synthetic rubber; polychloroprene (neoprene and viton); vinylidene fluoride resin, such as KYNAR, a trademark of Pennwalt Chemicals Corp.; polyamide resins, such as nylon; polyolefin; polyvinyl chloride (PVC); silicone; and tetrafluoroethylene polymer, such as TEFLON, a trademark of E. I. DuPont de Nemours.

In another embodiment of this invention, the electrically insulating tube could comprise a shrinkable and/or adhesive film with the adhesive layer on one or both sides and the film wrapped around the outer surface of the peripheral wall of the cup thereby producing two or more layers that could adhere to the wall of the cup. The thickness of film could be as little as ¼ mil up to the thickness required for good electrical insulating characteristics needed to electrically insulate the wall of the can from the wall of the cup. Preferably, the multi-layer tube composed of shrinkable and/or adhesive film would be between about ½ mil and about 7 mils thick, and more preferably between about 1 mil to 5 mils thick. Dependent on the thickness of the film, the electrically insulating tube could comprise several layers.

In all embodiments of this invention, it is preferred that the electrically insulating tube be extended over the edge of the wall of the cup so that the cup does not contact the electrode that is electrically connected to the can. Alternatively, an insulating ring, such as a plastic ring, could be disposed between the edge of the wall of the cup and the electrode that is electrically connected to the can.

Another embodiment of this invention relates to a process for assembling the components of a cell into a two-part conductive housing in which one part is a cup and the other part is a can, including the steps:

(a) preparing a cup with a peripheral wall terminating with an edge defining an opening;

(b) preparing an electrically insulating tube and securing the tube onto the outer wall of the cup, where the tube has a film with a thickness of less than 7.5 mils;

(c) preparing a can with a peripheral wall having an edge portion defining an opening;

(d) placing the component of the cell within the cup and can;

(e) placing the can over the cup so that the wall of the can is in parallel alignment with the wall of the cup and the electrically insulating tube is disposed in physical contact between the wall of the cup and the wall of the can; and (e) compressing the edge portion of the wall defining the opening of the can into the tube and onto the wall of the cup so as to effectively seal the cell.

Preferably the electrically insulating tube in step (b) would be a shrinkable tube or a tube comprising two or more layers of a shrinkable film. The tube can be heated before being disposed on the outer wall of the cup or could be heated after it is disposed on the outer wall of the cup.

Typical cell systems in which this invention can be used are alkaline manganese dioxide cells, air depolarized cells, nickel-cadmium cells and silver oxide-zinc cells.

The cup would be a triclad cup made of nickel, stainless steel and copper.

The can should be made of a conductive material that will not corrode or otherwise deteriorate when in contact with the materials of the cell. The can for the cell could be made of stainless steel, iron, nickel, nickel-plated steel, or some other conductive materials.

BRIEF DESCRIPTION OF THE DRAWINGS

The present invention will become apparent from the following description thereof when considered together with the accompanying drawings which are set forth as being exemplary of embodiments of the present invention and are not intended, in any way, to be limitative thereof and wherein:

FIG. 4 is a cross-sectional view of the can of FIG. 1 that is inverted and then placed on and over the open end of the cup.

FIG. 5 is a cross-sectional view of the cell of FIG. 4 after the wall of the can was crimped to provide a sealed cell and having a shrunk tube disposed between and secured between the outer surface of the wall of the cup and the inner surface of the wall of the can.

FIG. 6 is a cross-sectional view of the cell of FIG. 5, inverted.

DETAILED DESCRIPTION OF THE DRAWINGS

Figure 1:
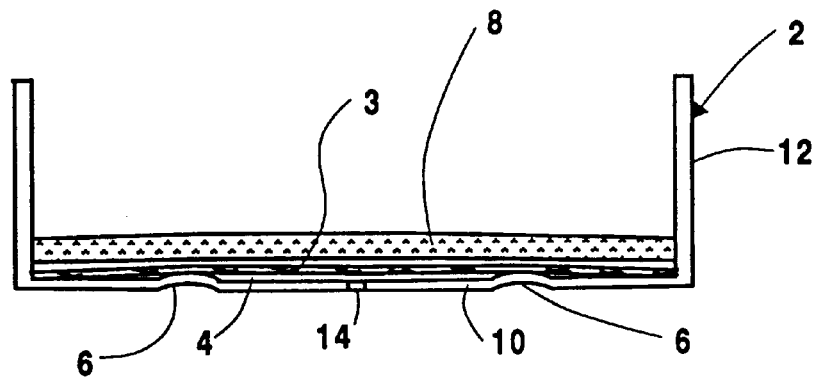
FIG. 1 is a cross-sectional view of an air electrode in a can.

FIG. 1 shows a circular can 2 with an air distribution membrane 4 secured to the inner surface of the can 2. A layer of polytetrafluoroethylene 3 covers the entire bottom of the can 2 including the air distribution membrane 4. The can 2 can have a patterned internal embossed sections 6 to provide a defined gap for uniform air distribution across the surface of an electrode 8 which is disposed within can 2. As shown in FIG. 1, the can comprises a base 10 being a peripheral upstanding wall 12 and disposed in base 10 is an opening 14. The electrode assembly containing the membrane 4, polytetrafluoroethylene layer 3 and electrode 8 can be secured within the can 2 by use of a reform die or the like, slanting the wall 12 of the can 2 to further secure the air electrode to the can 2.

Figure 2:
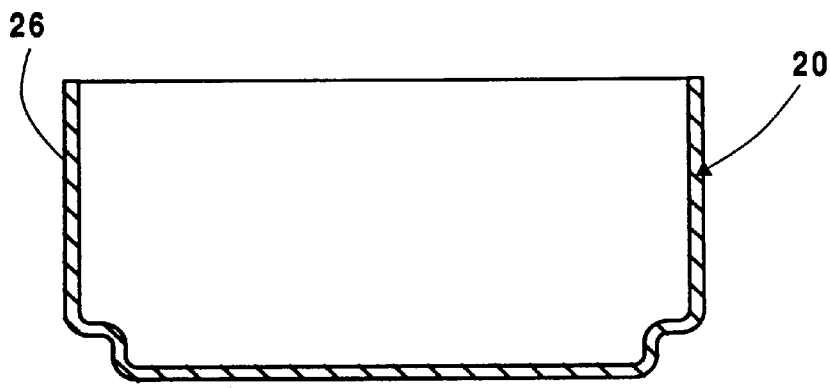
FIG. 2 is a cross-sectional view of a cup for use in this invention.
Figure 3:
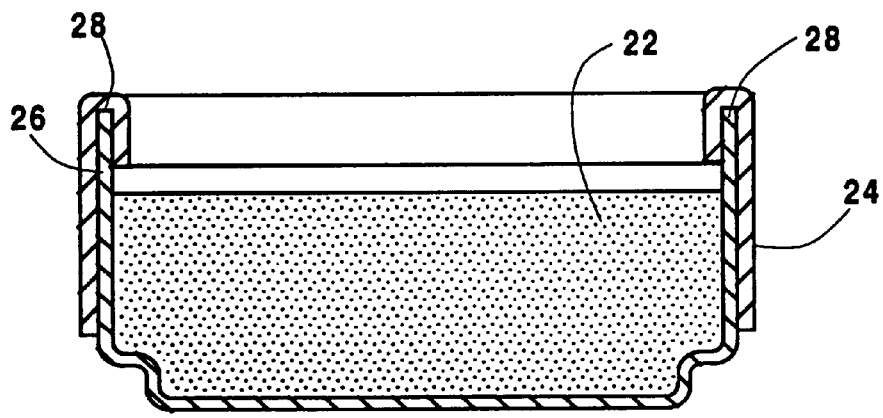
FIG. 3 is a cross-sectional view of the cup of FIG. 2 containing a shrunk tube secured to the outer wall of the cup in accordance with this invention.

FIGS. 2 and 3 show a cup 20 with a negative electrode mixture 22 of zinc powder, placed in the cup and making electronic contact with the cup 20. The negative electrode mixture 22 can comprise a mixture of zinc particles, electrolyte and organic compounds such as binders which make up the battery's negative electrode 22. The cup 20 can be made from a trilaminate material with copper that has been laminated to the bare side of a nickel-clad steel strip. A nickel layer could be used to protect the exterior surface of the steel strip. Other laminated materials from which the cup may be made include: a bilaminate of copper on a stainless steel substrate or a laminate made from more than three layers. Round disks punched from this laminated metal strip are then formed into a cup. The copper layer forms the inside surface of the cup and directly contacts the negative electrode mixture.

As shown in FIG. 3, a tube 24 of an electrically insulating material is shrunk onto the outer surface of the peripheral wall 26 of cup 20 and extending over the edge 28 of said wall 26. Although the tube 24 is shown as a unitary homogenous solid, it could comprise a tube made of two or more layers.

As shown in FIG. 4, the can 2 along with the inserted electrode assembly are inverted over the cup 20 which is preassembled according to this invention and contains negative electrode 22. The edge 28 of the wall of cup 20 which contains the shrunk tube 24, is disposed and rests on electrode 8.

As shown in FIG. 5, while the can 2 is inverted, the edge or rim 30 of the can 2 is crimped inwardly. The rim 30 of the can 2 is then compressed against the electrically insulating tube 24 between the cup 20 and the can 2 thereby forming a seal and an electrical barrier between the can 2 and the cup 20.

The cell of FIG. 5 is shown inverted in FIG. 6.

As shown in FIGS. 1 and 6, hole 14 is punched into the bottom of can 2 to act as air-entering ports. The cell shown in FIG. 5 and FIG. 6 has the can 2 in electrical contact with electrode 8 and the cup 20 in electrical contact with electrode 22 and thus the terminals of the cell are at opposite ends.

It is to be understood that modifications and changes to the preferred embodiment of the invention herein shown and described can be made without departing from the spirit and scope of the invention.

What is claimed:

1. A galvanic cell comprising:
   (a) a conductive cup, said cup having a circular upstanding peripheral wall and comprising a first electrode in physical contact with said cup;
   (b) a thin electrically insulating tube secured to the exterior surface of said cup's upstanding wall, wherein said tube is a shrunk tube comprising a film having a thickness less than 7.5 mils; and
   (c) a conductive can, said can comprising an upstanding wall with a rim and a second electrode in physical contact with said can, wherein the interior surface of said can's upstanding wall contacts the exterior surface of said insulating tube, thereby defining an enclosed volume, and the rim of said can is compressed against said tube to form a seal between said can and said cup.

2. The galvanic cell of claim 1 wherein the thickness of the film of the tube is between about ½ mil and about 7 mils.

3. The galvanic cell of claim 1 wherein the tube is disposed between the wall of the can and the wall of the cup and said tube extends over the edge of the wall of the cup and extends at least on to the opposing inner surface of the wall of the cup.

4. The galvanic cell of claim 1 wherein the electrically insulating tube is made of a unitary solid material.

5. The galvanic cell of claim 1 wherein the electrically insulating tube is made of at least two layers of electrically insulating film producing a multi-layer tube.

6. The galvanic cell of claim 1 wherein the electrically insulating tube is made of a material selected from the group consisting of synthetic rubber; polychloroprene; vinylidene fluoride resin; polyamide resins; polyolefin; polyvinyl chloride; silicone; and tetrafluoroethylene polymer.

7. The galvanic cell of claim 6 wherein an adhesive is disposed between the tube and the wall of the can.

8. The galvanic cell of claim 5 wherein the film on at least one of the tube surfaces contains a coating of an adhesive material.

9. The galvanic cell of claim 6 wherein an adhesive is disposed between the tube and the wall of the cup.

10. The galvanic cell of claim 5 wherein the thickness of the film is between about ¼ and about 7 mils.

11. The galvanic cell of claim 5 wherein the thickness of the multi-layered tube is between about 1 mil and about 5 mils.

12. A galvanic cell comprising:
    (a) a conductive cup, said cup having a circular upstanding peripheral wall and comprising a first electrode in physical contact with said cup;
    (b) a thin electrically insulating shrunk tube secured to the exterior surface of said cup's upstanding wall;
    (c) a conductive can, said can comprising an upstanding wall and a second electrode in physical contact with said can, wherein the interior surface of said can's upstanding wall contacts the exterior surface of said insulating tube, thereby defining an enclosed volume.

13. The galvanic cell of claim 12 wherein the shrunk tube is disposed between the wall of the can and the wall of the cup, and the shrunk tube extends over the edge of the wall of the cup and onto at least the opposing inner surface of the wall of the cup.

14. The galvanic cell of claim 12 wherein the electrically insulating shrunk tube is made of a unitary solid material.

15. The galvanic cell of claim 12 wherein the electrically insulating shrunk tube is made of at least two layers of an electrically insulating shrinkable film producing a multi-layer tube.

16. The galvanic cell of claim 12 wherein the electrically insulating shrunk tube is made of a material selected from the group consisting of synthetic rubber; polychloroprene; vinylidene fluoride resin; polyamide resins; polyolefin; polyvinyl chloride; silicone; and tetrafluoroethylene polymer.

* * * * *